(12) United States Patent
Hobbs

(10) Patent No.: US 8,804,508 B1
(45) Date of Patent: Aug. 12, 2014

(54) METHOD AND APPARATUS FOR USING A NETWORK APPLIANCE TO MANAGE MEDIA COMMUNICATIONS

(75) Inventor: David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 428 days.

(21) Appl. No.: 13/135,807

(22) Filed: Jul. 15, 2011

Related U.S. Application Data

(63) Continuation of application No. 12/838,058, filed on Jul. 16, 2010.

(60) Provisional application No. 61/226,241, filed on Jul. 16, 2009, provisional application No. 61/364,902, filed on Jul. 16, 2010.

(51) Int. Cl.
*H04J 3/16* (2006.01)
*H04N 11/02* (2006.01)
*H04N 21/24* (2011.01)
*H04L 29/06* (2006.01)
*H04N 21/63* (2011.01)
*H04N 7/26* (2006.01)

(52) U.S. Cl.
CPC .......... *H04N 21/2402* (2013.01); *H04L 65/601* (2013.01); *H04N 21/63* (2013.01); *H04N 19/00169* (2013.01)
USPC ...................... 370/230; 370/468; 375/240.26

(58) Field of Classification Search
None
See application file for complete search history.

(56) References Cited

U.S. PATENT DOCUMENTS

| | | | |
|---|---|---|---|
| 6,075,768 A | 6/2000 | Mishra | |
| 2008/0025400 A1 | 1/2008 | Sugimoto et al. | |
| 2008/0052414 A1* | 2/2008 | Panigrahi et al. ............. | 709/246 |
| 2008/0107173 A1* | 5/2008 | van Beek ................. | 375/240.02 |
| 2010/0121972 A1* | 5/2010 | Samuels et al. ................ | 709/231 |
| 2010/0195713 A1* | 8/2010 | Coulombe et al. ........ | 375/240.02 |
| 2010/0299552 A1* | 11/2010 | Schlack et al. .................... | 714/4 |

OTHER PUBLICATIONS

Barbera, M.; Licandro, F.; Lombardo, A.; Schembra, G.; Tusa, G.; , "DARED: A Double-Feedback AQM Technique for Routers Supporting Real-Time Multimedia Traffic in a Best-Effort Scenario," Control, Communications and Signal Processing, 2004. First International Symposium pp. 365-368, Tunisia, Mar. 2004.

Bergamasco, D. "Data Center Ethernet Congestion Management: Backward Congestion Notification", IEEE 802.1 Interim Meeting, Berlin, Germany, May 12, 2005, pp. 1-25.

(Continued)

*Primary Examiner* — Marcus R Smith
(74) *Attorney, Agent, or Firm* — Moser Taboada

(57) ABSTRACT

A method and apparatus for managing communication of encoded media from a plurality of media sources. In one embodiment, the method comprises determining, by a network appliance, an available bandwidth of a shared computer network connection used in the communication of the encoded media; communicating, by the network appliance, a common perception index value to the plurality of media sources; determining, by the network appliance, a required accumulated bandwidth for the encoded media communicated by the plurality of media sources; and adjusting, by the network appliance, the common perception index value based on a comparison of the available bandwidth and the required accumulated bandwidth; wherein the common perception index value defines a frame rate and a quantization level associated with the communication of the encoded media.

20 Claims, 10 Drawing Sheets

(56) References Cited

OTHER PUBLICATIONS

Charny, A.; Clark, D.D.; Jain, R., "Congestion Control With Explicit Rate Indication," Communications, 1995. ICC '95 Seattle, 'Gateway to Globalization', 1995 IEEE International Conference on Communications, pp. 1954-1963 vol. 3, Jun. 18-22, 1995, pp. 1-10.

Floyd, S., Handley, M., Padhye, J., and Widmer, J., May 2000, "Equation-Based Congestion Control for Unicast Applications" In Proceedings of the Conference on Applications, Technologies, Architectures, and Protocols for Computer Communication (Stockholm, Sweden, Aug. 28-Sep. 1, 2000), pp. 1-14.

Statistical Multiplexing Whitepaper, Tandberg Corporation, Sep. 2008, USA, pp. 1-2.

Bing Zheng; Atiquzzaman, M.;, "Traffic Management of Multimedia Over ATM Networks," Communications Magazine, IEEE, vol. 37, No. 1, pp. 33-38, Jan. 1999, USA.

Lubonski, M.; Gay, V.; Simmonds, A.;, "An Adaptation Architecture to Improve User-Perceived QoS of Multimedia Services for Enterprise Remote Desktop Protocols," Next Generation Internet Networks, 2005, vol., no., pp. 149-156, Apr. 18-20, 2005, Australia.

* cited by examiner

FIG. 9
FIG. 9A
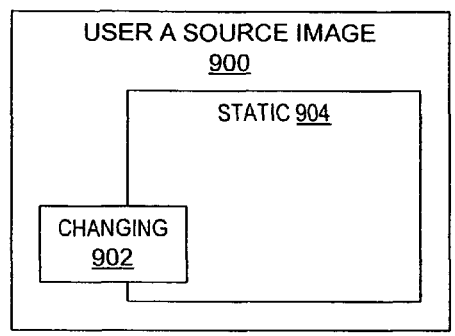
950
FIG. 9B
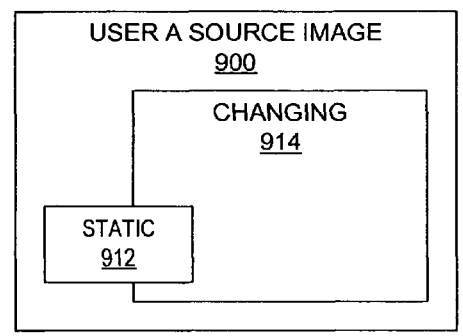
960
FIG. 10
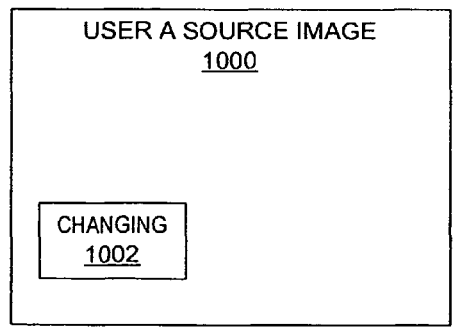
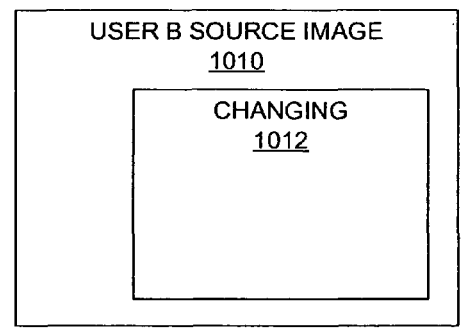
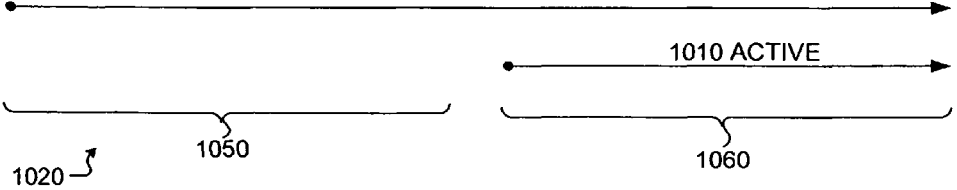

METHOD AND APPARATUS FOR USING A NETWORK APPLIANCE TO MANAGE MEDIA COMMUNICATIONS

CROSS-REFERENCE TO RELATED APPLICATIONS

This application is a Continuation in Part of U.S. patent application Ser. No. 12/838,058 entitled "Switch-Initiated Congestion Management Method" filed Jul. 16, 2010 which is herein incorporated in its entirety by reference and which claims benefit to U.S. provisional patent application Ser. No. 61/226,241, filed Jul. 16, 2009. This application also claims benefit of U.S. provisional patent application Ser. No. 61/364,902 filed Jul. 16, 2010 which is herein incorporated in its entirety by reference. This application also incorporates U.S. patent application Ser. No. 12/657,618 entitled "System and Method for Managing Multiple User Interface Sessions" filed Jan. 22, 2010 by reference in its entirety.

BACKGROUND OF THE INVENTION

1. Field of the Invention

Embodiments of the present invention relate generally to techniques for managing the flow of encoded media from various virtual machines to various associated clients through common packet switching and communication infrastructure. More specifically, a network appliance provides a common perceptual index to media encoders in order to manage the aggregate perceptual quality of media communicated across a shared channel.

2. Description of the Related Art

The pursuit for improved efficiencies in corporate computer infrastructure has resulted in an emerging trend to replace desktop computers with virtualized desktop infrastructure (VDI), where low complexity client devices connect to virtualized desktop computers located in a corporate data center via Local Area Network (LAN) or Wide Area Network (WAN). In such a model, high performance server computers in the data center each play host to many virtualized desktops and some form of remote computing protocol is deployed to facilitate the communication of the graphical user interface (GUI) from each virtualized desktop, typically to a corresponding remote client device. One challenge with such an approach relates to enabling network infrastructure to support the simultaneous communication of massive quantities of encoded media associated with many concurrent remote computing sessions without excessive network congestion. Such congestion causes packet loss or increased latency, either of which contributes to a degradation in the remote computing user experience. This is of particular significance to network protocols such as user datagram protocol (UDP) which lack inherent congestion control mechanisms.

Various explicit methods for managing network congestion related to continuous media streams, usually video, are known to the art. In the case of ACTIVE QUEUE MANAGEMENT (AQM), a network router drops packets when its buffers overflow. The specific AQM algorithm used in the Internet is called "Random Early Detection" (RED). Explicit Congestion Notification (ECN) is another method in which a bit in a packet en route to a client device is set by a network switch in the presence of congestion. The receiver then signals the congestion state to the transmitter during the packet acknowledgement process. In a related Forward Explicit Congestion Notification (FECN) method proposed for datacenter Ethernet networks, sources periodically generate probe packets that are modified by the switches along the path and then reflected by the receivers back to the sources. The sources react to the feedback received in the returning probes and set their video rate accordingly. If there are multiple congestion points on the path of a flow, multiple backward control messages will be sent back while only one of these—one with the highest level of congestion indication—will dominate the future rate of the flow. Backward Congestion Notification (BCN) is an alternative scheme proposed for congestion notification in datacenter Ethernet networks (under IEEE 802.1Qau group) in which congestion points signal the sender in the event of congestion, rather than requiring the receiver to reflect probe packets.

Datagram congestion control protocol (DCCP) and Dynamic Video Rate Control (DVRC) are other methods used in streaming video applications which rely on sender and receiver interaction to determine bandwidth and round trip time (RTT) estimates to facilitate adjusting the rate of the transmitted video stream.

The Asynchronous Transfer Mode (ATM) network architecture enables multimedia transport at guaranteed service levels using various traffic classes with different service policies. Constant bit rate (CBR) and variable bit rate (VBR) modes provide guaranteed cell rates negotiated during connection establishment, while available bite rate (ABR) mode uses available bandwidth to achieve further network utilization and the possibility of bandwidth renegotiation during transmission. Multimedia ATM architectures support continuous adjustment of the source rate based on congestion feedback information provided from the network while the connection remains active. In the presence of multiple video connections, fair bandwidth sharing or bandwidth scheduling methods may be used to allocate the bandwidth. However, such schemes lack flexibility to adjust to the time-varying nature of video.

Generally, methods directed to rate control of multiple media streams have not been optimized to meet the specific requirements of a VDI deployment in which network bandwidth and user experience associated with multiple concurrent remote computing sessions should be managed at a system level. Therefore, there is a need in the art for managing network congestion associated with multiple concurrent remote computing sessions.

SUMMARY OF THE INVENTION

Embodiments of the present invention generally relate to a method and apparatus for managing communication of encoded media from a plurality of media sources. In one embodiment, the method comprises determining, by a network appliance, an available bandwidth of a shared computer network connection used in the communication of the encoded media; communicating, by the network appliance, a common perception index value to the plurality of media sources; determining, by the network appliance, a required accumulated bandwidth for the encoded media communicated by the plurality of media sources; and adjusting, by the network appliance, the common perception index value based on a comparison of the available bandwidth and the required accumulated bandwidth; wherein the common perception index value defines a frame rate and a quantization level associated with the communication of the encoded media.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 is an illustration of a user display image over two time periods in accordance with one or more embodiments of the present invention;

FIG. 10 is an illustration of two user display images over two time periods in accordance with one or more embodiments of the present invention.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. Additionally, the invention encompasses all possible modifications and variations within the scope of the issued claims.

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

Figure 1:
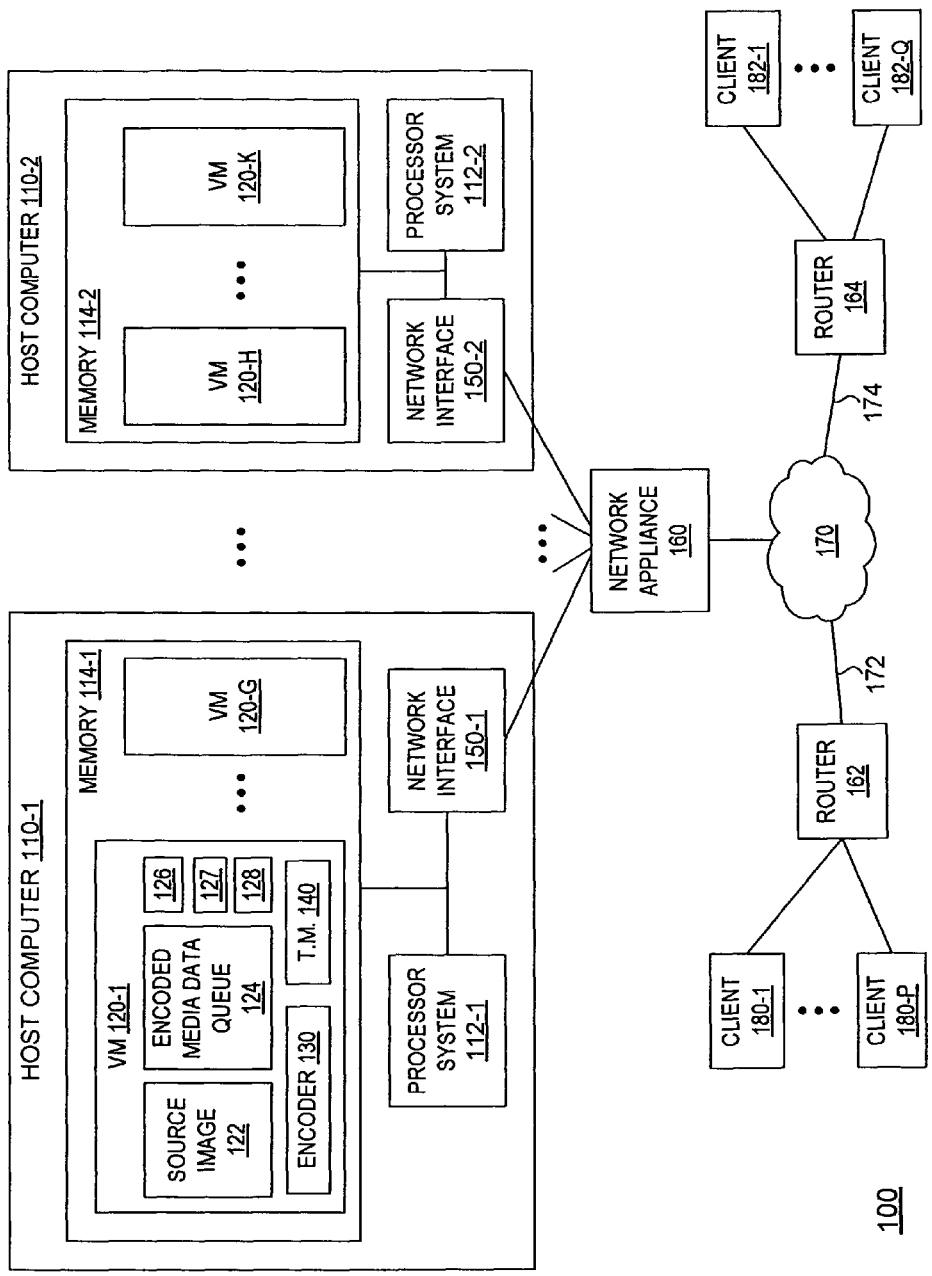
FIG. 1 is a block diagram of a networked media communication system comprising multiple virtual machines connected to a plurality of clients in accordance with one or more embodiments of the present invention.

FIG. 1 illustrates selected details of an embodiment of a networked media communication system 100 ("system 100") comprising multiple host computers shown as a host computer 110-1 and a host computer 110-2, each comprising multiple media sources. In various embodiments, each media source comprises a virtual machine (VM), illustrated as VM 120-1 through 120-G in a memory 114-1 for host computer 110-1 and as 120-H through 120-K in a memory 114-2 for host computer 110-2. Alternative media sources such as streaming video or audio sources are contemplated in alternative embodiments. Two host computers (referred to as host computers 110) and four virtual machines (referred to as VMs 120) are depicted for convenience but system 100 supports many host computers and tens or hundreds of virtual machines in different embodiments. Those of ordinary skill in the art will appreciate that the various data structures (including source image 122, encoded media data queue 124, Perceptual Quality Index (Pdx) 126, Queue Index (Qdx) 127 and required transmission rate 128 (i.e., a bandwidth forecast) and machine executable software components (including encoder 130 and traffic manager 140) of VM 120-1 are also present in the other VMs of system 100, although not expressly illustrated. Each VM 120 is communicatively coupled via a communication session to one of a plurality of clients 180 or 182 (illustrated as clients 180-1, 180-P, 182-1 and 182-Q) by a common appliance 160 (i.e., 'appliance 160', also referred to as 'network appliance 160') and a computer network 170. In an exemplary embodiment, a server platform (i.e., a host computer 110) hosts up to 128 VMs 120, each coupled to one of 128 clients 180 or 182 via network 170.

In an embodiment, each VM 120 is an independent computer or part of a computing platform, such as a computer server or the like, coupled to and enabled to communicate with one or more communication endpoints, such as one or more of the plurality of clients 180 or 182. Each client 180 or 182 typically comprises an image decoder function, one or more computer display devices, and various I/O devices, such as a keyboard, mouse, and the like. Each VM 120 establishes a communication session with one of the plurality of clients 180 or 182 and uses the communication session to communicate media, such as digitized audio data and encoded image updates, to the associated client 180 or 182 (i.e., each VM 120 is typically associated with one client 180 or 182 by means of the communication session).

VM 120 is an environment generally designated for running software associated with a user interface located at client 180 or 182. In various embodiments, the VM 120 comprises software components such as operating system, driver software, virtualized network interface and application software located in memory 114 for execution by a processor subsystem 112 (illustrated as a processor system 112-1 and a processor system 112-2) configured to execute machine readable instructions. In an exemplary embodiment, each VM 120 comprises an operating system, such as a WINDOWS operating system from MICROSOFT, Inc. (e.g., WINDOWS XP or WINDOWS 7), a LINUX operating system available from many vendors, or a UNIX operating system, also available from many vendors including HEWLETT-PACKARD, Inc., or SUN MICROSYSTEMS, Inc. The application software, (e.g., word processing software, spreadsheets, financial data presentation, video or photo display or editing software, graphics software such as Computer Aided Design (CAD) software, Desktop Publishing (DTP) software, digital signage software, or the like) executes in conjunction with graphics drivers (e.g., OPENGL from SILICON GRAPHICS corporation, DIRECTX from MICROSOFT CORPORATION, ADOBE FLASH) or image composition software (e.g., the WINDOWS VISTA Desktop Windows Manager (DWM), or QUARTZ or COCOA from APPLE CORPORATION) to generate source image 122. In an embodiment of system 100 in which desktop display images are compressed and transmitted, source image 122 comprises a 2D array of pixel values suitable for display presentation. In an embodiment comprising an audio system, source image 122 comprises audio data. Source image 122 is generally maintained in one or more designated regions of memory 114, such as one or more frame buffer regions or alternative suitable image storage memory. It will be recognized by those skilled in the art that embodiments of VM 120 generally include other application software, operating system components, drivers, administrative software and the like, not depicted in FIG. 1 so as not to obscure aspects of the present invention.

Memory 114 comprises any one or combination of volatile computer readable media (e.g., random access memory (RAM), such as dynamic random access memory (DRAM), static random access memory (SRAM), extreme data rate (XDR) RAM, Double Data Rate (DDR) RAM and the like) and nonvolatile computer readable media (e.g., read only memory (ROM), hard drive, tape, CDROM, DVDROM, magneto-optical disks, Erasable Programmable Read-Only Memory (EPROM), Electrically Erasable Programmable Read-Only Memory (EEPROM), Flash EPROM and the like). Moreover, memory 114 may incorporate electronic, magnetic, optical, and/or other types of storage media. Each VM 120 further comprises additional elements, such as a programmable encoder 130 ('encoder 130') and a traffic manager 140 executed by the processor system 112 in the context of the associated VM 120. In some embodiments, at least part of the encoder 130 and traffic manager 140 are implemented as hardware elements (such as part of an Application Specific Integrated Circuit (ASIC) or integrated hardware function of a processor sub-system), or as software components in memory 114 (such as one or more virtual appliances executed by a hypervisor or as a combination of virtual appliances and software components executed in the domain of a VM 120), a software function executed by a processor external to processor system 112 (such as a Reduced Instruction Set Computer (RISC) processor integrated in an ASIC), or as a combination of software and hardware components.

The processor system 112 (illustrated as a processor system 112-1 and a processor system 112-2) typically comprises one or more central processing units (CPUs) each comprising one or more CPU cores, one or more graphical processing units (GPUs) or a combination of CPU and GPU processing elements. Examples of a well known suitable CPU include workstation or server class processors such as 32-bit, 64-bit, or other CPUs including OPTERON or ATHLON class microprocessors manufactured by AMD Corporation; XEON, 'Core i7' or X86 class processors manufactured by INTEL; or a microprocessor such as a PowerPC or SPARC processor. However, any other microprocessor platform designed to perform the data processing methods described herein may be utilized.

The network interface 150 (illustrated as a network interface 150-1 and a network interface 150-2) provides a high bandwidth and low latency packet interface such as Gigabit Ethernet, 10 Gigabit Ethernet or Fiber Channel coupling between the processor system 112 and the appliance 160 (in the case of encoded media communications between a VM 120 and a client 180 or 182) or between the processor system 112 and a network (such as a LAN, WAN or the like) in the case of general data communications between a VM 120 and an endpoint such as a file server, web server or the like. Network interface 150 typically provides physical (PHY) and Media Access Layer (MAC) network services for processor system 112. In some embodiments, network interface 150 is dedicated to supporting communications between VMs 120 and clients 180 or 182 and additional network interfaces are deployed to support other general data communications. Typically, higher layer network services such as TCP/IP and/or UDP/IP encapsulation, communication setup and teardown service, authentication functions, and security protocols such as provisioning of secure channels and packet encryption are provided by functions of VM 120 but one or more such services may be provided by an underlying hypervisor, a software appliance or implemented as functions of network interface 150. In an embodiment, the processor system 112 and network interface 150 are coupled to memory 114 by one or more bus structures, such as memory, image, and/or I/O busses known to the art.

The collective VMs 120-1 through 120-G of host computer 110-1 are generally scheduled for execution by a hypervisor function omitted from FIG. 1. Such a hypervisor may be one of several commercially available hypervisor products including VMWARE ESX SERVER from VMWARE corporation, XENSERVER from CITRIX Corporation, or HYPER-V from MICROSOFT Corporation.

Generally, the encoder 130 (detailed in FIG. 2) is an image stream encoder that uses various encoding techniques (e.g., image transformations) defined by a set of encoding parameters to encode source image 122 and generate encoded media data. Typically, a packet management function of VM 120 (not shown in FIG. 1) segments the encoded media data into packets, applies packet headers and queues the encoded media in encoded media data queue 124 ('queue 124') for transmission. The queue 124 comprises one or more regions of memory 114 designated for the storage of encoded media data, e.g., in the form of compressed pixels, progressive refinement updates, video descriptors and/or drawing commands generated by encoder 130.

Traffic manager (TM) 140 is generally a data management and scheduling function that manages bandwidth allocation and regulates the flow of encoded media data between queue 124 and appliance 160 by setting the relative transmission priority for encoded media data against competing data such as connection management data, Universal Serial Bus (USB) or audio peripheral device data or file transfers. Traffic manager 140 assembles one or more transfer command queues comprising prioritized Direct Memory Access (DMA) instructions. The DMA instructions are consumed by list processing (i.e., DMA) functions of network interface 150 to ensure the scheduled transfer of encoded media at the specified bit rate. Traffic manager 140 enables queue 124 to be emptied at the specified bit rate by providing a time base periodically synchronized with real time clock services from the underlying hypervisor. In various methods described herein, traffic manager 140 is tasked with temporary adjustment of the transmission rate or suspension of encoded media data flow in response to Qdx messages received from the appliance 160.

In various embodiments, processor system 112, memory 114 and network interface 150 are coupled with the aid of support circuits, including at least one of north bridge, south bridge, chipset, power supplies, clock circuits, data registers, I/O interfaces, and network interfaces. In other embodiments, the support circuits include at least one of address, control, interrupt and/or data connections, controllers, data buffers, drivers, repeaters, and receivers to enable appropriate communications between the CPU processor, memory 114 and network interface 150. In some embodiments, the support circuits further incorporate hardware-based virtualization management features, such as emulated register sets, address translation tables, interrupt tables, Peripheral Component Interconnect (PCI) I/O virtualization (IOV) features, and/or I/O memory management unit (IOMMU) to enable DMA operations.

Figure 3:
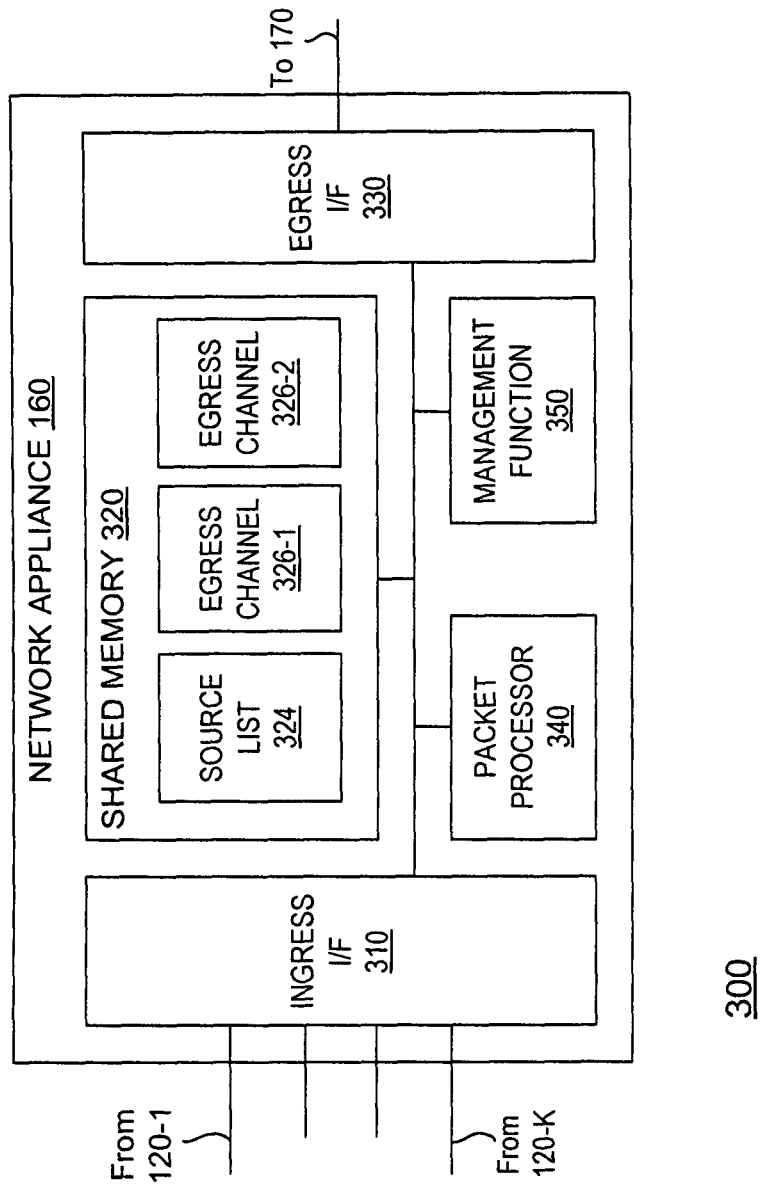
FIG. 3 is a block diagram of a network appliance enabled to communicate a common perceptual quality index to a plurality of virtual machines in accordance with one or more embodiments of the present invention.

The appliance 160 comprises a processing function (e.g. a combination of processor, switch queue monitoring facilities, and machine-readable software) designated to execute a control method that generates a common perceptual quality index (Pdx) 126 (also referred to as Pdx value 126) and, in some embodiments, a Qdx 127 (also referred to as Qdx value 127) in response to bandwidth forecasts provided by the various VMs 120. An embodiment of such a network appliance is depicted in FIG. 3.

The network 170 comprises a communication system (e.g., the Internet, LAN, WAN, and the like) or similar shared packet switched network that employs various well-known protocols (e.g., TCP/IP, UDP/IP and the like) to connect computer systems completely by wire, cable, fiber optic, and/or wireless links facilitated by at least one appliance 160. Embodiments of the present invention may also comprise well-known network elements, such as hubs, switches, and/or routers (such as router 162 coupled to appliance 160 by shared computer network connection 172 ('link 172') and router 164 coupled to appliance 160 by link 174.) between the appliance 160 and a client 180 or 182. In other embodiments, routers 162 and/or 164 are replaced or augmented by layer 2 switching devices known to the art. In various embodiments links 172 and 174 represent different constrained network paths such as WAN links between a data center and different facilities such as branch offices, with clients 180 located at one facility and clients 182 located at a different facility. The processing methods disclosed herein anticipate at least one such shared link, typically to a facility, although multiple such links, each operating under different constraints are generally anticipated (e.g., a combination of separate shared T1, 10 Mb/s, 100 Mbps and/or DS3 links, and the like) to different facilities. As one specific deployment example, link 172 comprises a T1 link for 5 clients 180 at a first facility and shared link 174 comprises a DS3 link for 120 clients 182 at a second facility. In some cases, links 172 or 174 might provide unreliable bandwidth (e.g. Digital Subscriber Line (DSL) service) and network appliance 160 adjusts the perceptual quality experienced at the clients 180 or 182 responsive to the varying available bandwidth.

Clients 180 and 182 are generally any form of computing device that can display or store media, such as image data, and connect to network 170. For example, in an embodiment, clients 180 and 182 are remote terminals in a networked computer system (e.g., in an embodiment, system 100 is a remote computing system). Such remote terminals include zero clients, thin clients, personal or tablet computers, workstations, Personal Digital Assistants (PDAs), wireless devices, storage systems, and the like. In some embodiments, each client 180 and/or 182 incorporates an image decoder that decodes image information for presentation on one or more local display devices, such as a remote Graphical User Interface (GUI). In other embodiments, clients 180 and/or 182 also comprise one or more peripheral devices such as mouse, keyboard, and/or other well known peripherals such as printers, webcams, microphones and speakers.

Figure 2:
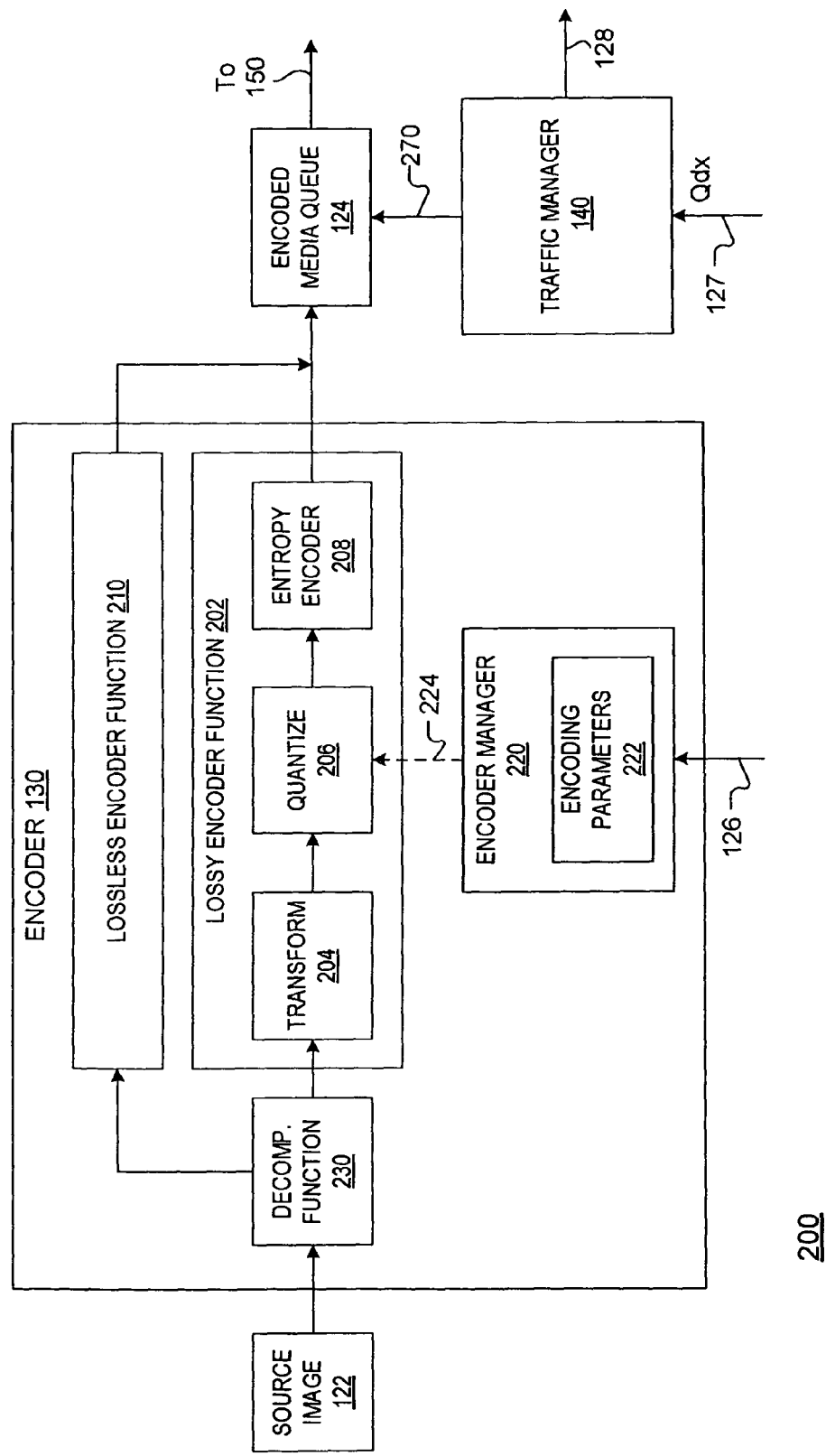
FIG. 2 is a block diagram illustrating media flow from a media source to an encoded media queue through a programmable encoder in accordance with one or more embodiments of the present invention.

FIG. 2 is a block diagram 200 of the encoder 130 coupled between source image 122 and an encoded media data queue 124 in accordance with one or more embodiments of the present invention. Different regions of source image 122 are typically updated at different times by any of the installed software applications in an asynchronous manner. Unlike a constant frame rate video sequence, these image updates may be sporadic from both spatial and temporal perspectives.

The encoder 130 is an image encoder typically comprising a decomposition function 230, a lossy encoder function 202 and a lossless encoder function 210 under control of encoder manager 220. Decomposition function 230 classifies changed regions of source image 122 according to encoding requirements, for example high contrast regions (e.g., text) or monotone backgrounds are designated for lossless encoding by encoder function 210 while pictures (e.g., JPEG image representations) or frames associated with video sequences are designated for lossy encoding by encoder function 202. In some embodiments, the lossy encoder function 202 comprises progressive encoding capabilities in which an initial lossy reproduction (i.e., an inexact replica) of a display image is refined over a period of time, culminating in a lossless reproduction of the display image. In an embodiment, the lossy encoder function 202 includes a transform function 204, a quantize function 206, and an entropy encoder function 208 which transform changed regions of source image 122, quantize the resulting transform coefficients to a quantization level specified by quantization level 224 and perform entropy encoding on the quantized values.

The transform function 204 applies a transform function to changed regions of source image 122 using Discrete Wavelet Transform (DWT), Discrete Cosine Transform (DCT), Discrete Fourier Transform (DFT), or alternative comparable image transform methods known to the art. The quantize function 206 reduces the number of bits of the resulting transformed coefficients by reducing a precision for each resulting transformed coefficient. The entropy coder function 208 further compresses the quantized values using lossless coding methods such as Huffman encoding, Golomb coding, variable length coding (VLC), context-adaptive VLC, context-adaptive binary arithmetic coding (CABAC) or comparable methods.

Encoder manager 220 initiates a scan of source image 122 (or a portion thereof) for pixel changes, typically responsive to queue 124 reaching a 'near empty' state but alternatively at a specified frame encoding rate determined by encoding parameters 222 in some embodiments. In certain embodiments, the frame rate for all or part of source image 122 (e.g. a part of the image associated with user typing activity) may be increased temporarily to support improved interaction between the user and computer 110 (e.g., based on detection of cursor events, keystrokes or mouse movement associated with a client 180 or 182). Such an increase in frame rate may require a corresponding temporary decrease in static image quality (i.e., increased image quantization level) to maintain a transmission bandwidth level in accordance with a bandwidth forecast provided by encoding manager 220 to appliance 160. In some embodiments, encoder manager 220 specifies different encoding rates for different specified regions of source image 122. In one embodiment, one or more regions for which minimum latency is desirable, such as select regions associated with a cursor or mouse pointer location, are assigned a higher encoding rate or prioritized over other regions of source image 122. In embodiments where content types are specified for encoding at a reduced quality, for example as determined by administrative policies (e.g., video content specified for reduced quality), image frames are subjected to temporal filtering before encoding. Such sub-sampling may be strictly periodic, or based on knowledge of the image content, or based on change characteristics or a combination thereof. In some embodiments, encoding priorities are further determined by image update attributes (e.g., time elapsed since updated image content has been transmitted), media type (e.g., lossless content updates prioritized over residual updates for natural image types), or device-dependent attributes (e.g., pointer updates or updates related to cursor position prioritized over other content updates.

Encoding parameters 222 comprise a quantization level 224 and a frame rate that determine the optimum operation of encoder 130 for a specified Pdx 126. The Pdx 126 determines quantization level 224, using for example the Pdx vs. compression ratio curves provided in graph 600 described below. In an embodiment, the quantization level 224 is based at least in part on the number of pixels of source image 122 that have changed since a previous encoding of source image 122 (i.e. the updated portion of source image 122). The quantization level 224 changes the image quantization level which in turn adjusts the compression ratio for one or more specified changed image regions, changes the fill rate of queue 124, and increases or decreases perceptual image quality. A high compression ratio is accomplished by setting aggressive coefficient values in one or more quantization tables so that compressed media consumes a limited available bandwidth. High image quality is accomplished by reducing the quantization level to produce perceptually lossless or near-lossless representations of the source image 122. Parameters 222 may also comprise additional encoder specifications such as a defined initial quality level and progressive refinement rate for a progressive encoder.

Lossless encoder function 210 comprises at least one of a Golomb encoder, Rice encoder, Huffman encoder, variable length encoder (VLC), context-adaptive VLC Lempel-Ziv-Welch (LZW) encoder or context-adaptive binary arithmetic encoder (CABAC) suited to lossless encoding of image regions designated for lossless encoding. In some embodiments, lossless encoder function 210 is also enabled for residual encoding of unchanged image sections, previously designated for lossy encoding and a specified (lossy) quality level has been reached.

The encoder manager 220 is generally a controller, such as an embedded processing core (e.g., a microprocessor core from MIPS Technologies), and related software functions and/or a logic circuit configured to manage the various functions of encoder 130. Encoder manager 220 configures the lossy and lossless encoder functions 202 and 210, manages the scanning of source image 122 for changes (e.g., utilizing a dirty mask to record changed pixel values) and provides Direct Memory Access (DMA) resources for accessing source image 122 or storing encoded media data in queue 124. In some embodiments, encoder manager 220 monitors drawing commands issued by application software of VM 120 to determine changed areas of source image 122 or determine content type (e.g., video, photograph or text content types). By identifying the content type, encoder 130 is enabled to select the most appropriate encoder function and optimum compression level.

The traffic manager 140 generally determines a required transmission bandwidth 128 (i.e., bandwidth forecast) which is communicated to appliance 160. The bandwidth forecast is based on the size of an encoded data set generated by encoder 130 in view of the current frame rate or a predicted size of an encoded data set associated with a forthcoming encoding operation. Such a prediction might be based on determination of changed image area, historic bandwidth, determination of image content type and so on. In some embodiments, appliance 160 periodically provides traffic manager 140 with an updated Qdx value 127, where after traffic manager 140 responds by one of i) temporarily suspending media transmission from queue 124 to network interface 150; ii) temporarily reducing or increasing the packet rate from queue 124 to network interface 150 or iii) resuming a media transmission packet rate from queue 124 to network interface 150 equivalent to the rate at which queue 124 is filled by encoder 130.

In one or more embodiments, components of the encoder 130 and traffic manager 140 are implemented as a set of computer-executable instructions in a VM 120, a digital media processor or virtualized appliance, an Application Specific Integrated Circuit (ASIC) configured, at least in part, as a logic circuit to perform image encoding, field-programmable Gate Array (FGPA), and/or electronic hardware suitable for performing image encoding or any combination thereof.

FIG. 3 is block diagram 300 of an embodiment of network appliance 160, generally enabled to execute the method 400 described below. Appliance 160 maximizes the use of available bandwidth on each shared link (ref. links 172 and 174), minimizes transmission delay by optimizing queue depths between the media source and the client and enables all users of a shared link to share the available bandwidth such that each user is provided an optimum user experience consistent with other users of the shared link. Appliance 160 comprises ingress and egress interfaces 310 and 330, respectively, each interface comprising physical, data-link, and network layer interfaces known to the art that provide compatibility with network 170. In one embodiment, appliance 160 comprises a physical apparatus such as an access switch workgroup switch, or network router. In another embodiment, at least part of appliance 160 comprises virtualized elements executed as machine readable instructions in the hypervisor domain or a virtual machine of a server platform. In some such virtualized embodiments, input and/or output physical layer interfaces are substituted with interfaces to memory of the server platform.

Shared memory 320 generally comprises data buffers enabled to queue encoded media and other data types traversing the appliance 160. Such data buffers include receivers for receiving encoded media from active media sources (such as VM 120-1 through VM 120-K of system 100) and egress channels 326 (shown as an egress channel 326-1 and an egress channel 326-2) allocated to queue encoded media en route to client endpoints. Egress channels 326 comprise physically or logically separated memory structures reserved for encoded media from queues 124. While only two egress channels 326 are depicted in illustration 300, typically each shared computer network connection (ref. link 172 and link 174) associated with appliance 160, identified by a common IP or sub-net address, a VLAN identifier, proprietary address information in packet headers or the like, is allocated a separate egress channel (i.e., in an embodiment, egress interface 330 may comprise multiple physical interfaces connected to different downstream routers or switches).

Packet processor 340 generally provides switching and/or routing functions including network protocol processing, bandwidth allocation, scheduling, traffic shaping, packet header inspection and generic traffic management functions for managing the flow of encoded media traffic and other network data from ingress interface 310 to egress interface 330. In an embodiment, packet processor 340 comprises one or more processing engines, such as advanced RISC machine (ARM), Microprocessor without Interlocked Pipeline Stages (MIPS), serial data processor (SDP), and/or other RISC cores enabled to execute buffer management, table lookup, queue management, fabric processing, and host processing functions known to the art. In an exemplary embodiment, processor 340 comprises an XSCALE processor from MARVEL Corporation or similar switch processor from BROADCOM Corporation, operating in conjunction with a suitable host processor such as a POWERPC processor.

Management function 350 generally comprises processing functions enabled to execute select steps of method 400 such as determination of required accumulated bandwidth and available bandwidth, adjustment of Pdx value 126, determination of Qdx 127, monitoring queue levels of egress channels 326 and setting egress traffic shapers. In an embodiment, function 350 comprises a logic sequencer, an independent processor (such as a MIPS or PowerPC processor) with a set of machine readable instructions stored in local memory or a set of machine readable instructions executed by a function of a physical or virtualized packet processor 340. Management function 350 is enabled to configure and manage source list 324 which provides a view of currently subscribed VMs 120 to which Pdx values 126 are communicated. In one embodiment, management function 350 manages the subscriptions based on the presence or absence of content from particular host domains (i.e., VMs 120) in the egress channels 326. If a particular media source stops transmitting encoded media data for a defined period, the subscription expires and the communication of Pdx values 126 ends until a new communication session is established. Such an embodiment addresses the case of a user disconnecting from a client 180 or 182 for a short period (e.g., a few minutes) and establishing a different network path when the communication session is re-established.

Figure 4:
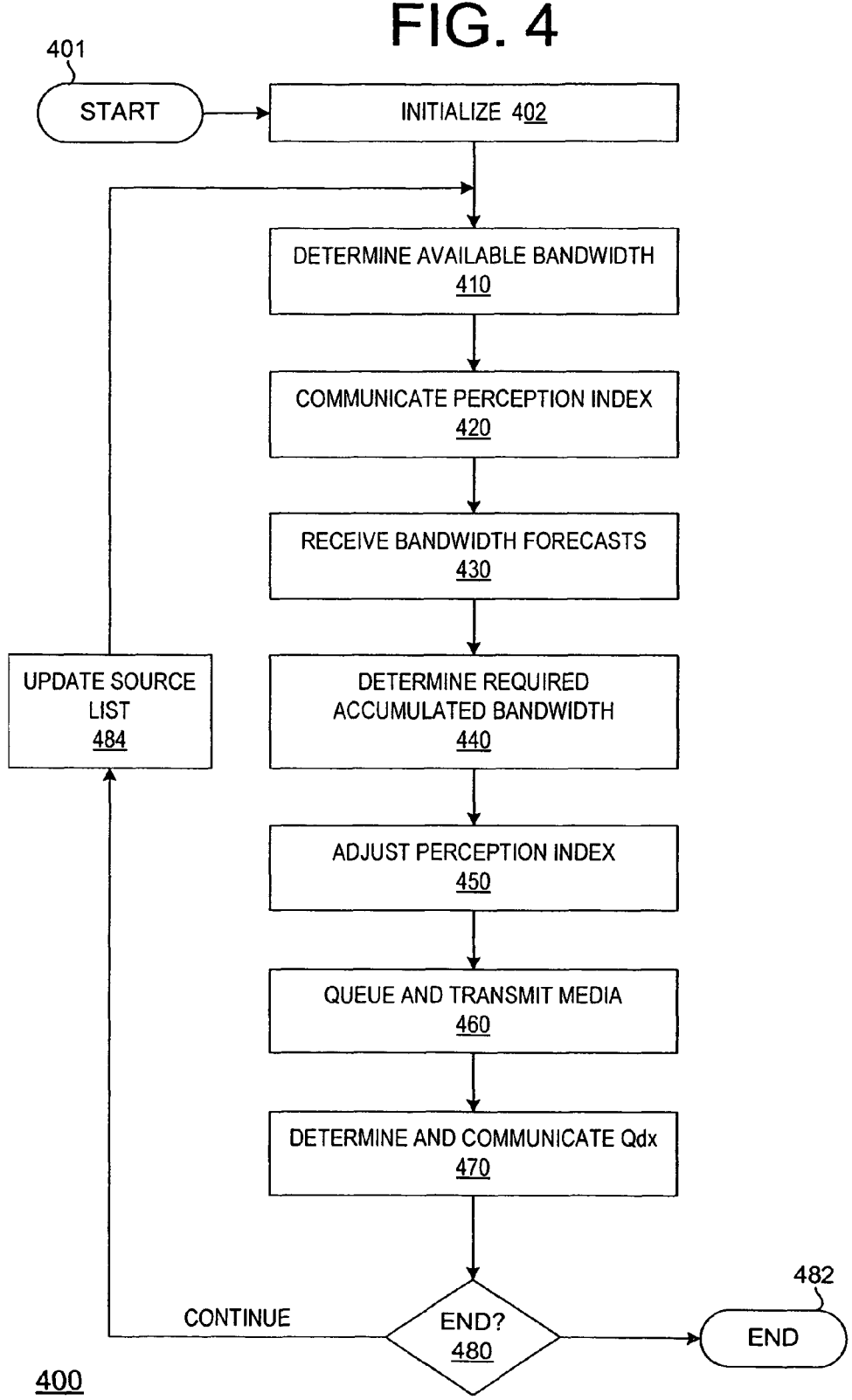
FIG. 4 is a flowchart illustrating a method for managing communication of encoded media from a plurality of media sources in accordance with one or more embodiments of the present invention.

FIG. 4 is a flow diagram of a method 400 for managing communication of encoded media from a plurality of media sources (e.g. a plurality of VMs 120) as may be executed by appliance 160 in accordance with one or more embodiments of the present invention. Generally, method 400 manages bandwidth associated with shared computer network connections (such as link 172 and link 174) at a system level by providing feedback from appliance 160 to encoders (ref. encoder 130) and, in some embodiments, traffic managers (ref. TM 140), thereby enabling relatively consistent packet rates for encoded media streams.

Method 400 starts at step 401 and proceeds to step 402 ("Initialize"). Initialization comprises allocation of resources in the appliance 160, including initialization of receivers, egress channels, switching resources, address tables, processing resources, memory bandwidth, and the like. A source list that maps each VM 120 to an egress channel (e.g., an egress channel 162) is established so that individual bandwidth forecasts can be aggregated and tracked as accumulated bandwidth forecasts associated with each egress channel. Communication sessions that share an egress channel may be logically grouped so that the corresponding media sources can be managed as a group (i.e., communication of a common Pdx value 126 to the group of media sources associated with each egress channel). In some embodiments, one or more VMs pre-subscribe with appliance 160 during client session establishment. The pre-subscription step provides each VM an opportunity to forecast bandwidth requirements, for example according to historic bandwidth usage or administrative settings, in advance of media transmission. It also enables appliance 160 to estimate a meaningful start Pdx value 126 based on the number of media sources subscribed and initial available bandwidth. In some embodiments, appliance 160 observes packet headers (presented as non-encrypted 'clear text' headers in some embodiments) for transport protocol information such as VM source IP address or alternative VM identifier and destination client IP address of packets communicated through the appliance 160 in order to determine the identity of media sources mapped to each egress channel.

Method 400 proceeds to step 410 ("Determine available bandwidth"). In select embodiments, characteristics including available channel bandwidth, and optionally round trip latency are determined for each egress channel 326 by observing the steady state aggregate bandwidth (or variations therein) of all the communication sessions associated with each egress channel. In an exemplary embodiment in which User Datagram Protocol (UDP) is utilized at the network transport layer, packet loss metrics are used to determine available bandwidth. Appliance 160 observes transport protocol information such as existence and timing of anticipated response acknowledgement messages (i.e., 'transport acknowledgement') associated with packets used to transport the encoded media. The application layer is monitored for No Acknowledgement 'flack' messages (e.g., as communicated by a client 180 or 182 to a VM 120) when an expected packet, typically identified by a sequence number, is dropped by network 170. The measured available bandwidth at which such 'nack' messages become statistically significant (e.g., a packet loss determined to be greater than the target packet loss stipulated in a Service Level Agreement (SLA) for the network 170) generally determines the available bandwidth associated with the shared link. In other embodiments, available channel bandwidth is predetermined based on known network characteristics or historic usage patterns.

Method 400 proceeds to step 420 ("Communicate perception index") where a common Pdx value 126 is communicated from appliance 160 to each VM 120 associated with a common egress channel 326. On an initial pass, each VM may be issued an initial Pdx value 126, such as a default value (e.g., 50) or a value based on communication history, pre-registration information, a predicted accumulated bandwidth, initial accumulated bandwidth or the like. On subsequent passes, the updated Pdx 126 determined at step 450 (described below) is communicated. For efficiency purposes, the Pdx value 126 may be appended in a packet header of unrelated communications between the client 180 or 182 and a VM 120.

Method 400 proceeds to step 430 ("Receive bandwidth forecasts"). Step 430 comprises receiving a bandwidth forecast from each of the VMs 120 associated with a particular egress channel 326, each bandwidth forecast indicating the bandwidth required to communicate the media data in an encoded media queue (e.g., encoded media data queue 124) ready for communication (i.e., a respective portion of the encoded media comprising an encoded image frame or partial encoded image frame) or predicted encoded media associated with a forthcoming encoding operation. The bandwidth forecast may be calculated at each VM 120 by dividing the size of the encoded media data set in queue 124 (typically expressed as megabits) by the frame period (i.e., an inverse of the present frame rate) specified by the present Pdx value 126. In an embodiment, a predicted bandwidth forecast is incorporated with one of the last encoded media packets associated with an encoded frame (e.g., as an extractable value) and communicated to appliance 160, providing appliance 160 an opportunity to respond to the bandwidth forecast by adjusting Pdx value 126 (step 450 described below) before the next frame is encoded. In another embodiment, the calculated bandwidth forecast is incorporated with a first packet of an already encoded frame, providing appliance 160 an opportunity to broadcast an updated Pdx to other VMs 120 before the encoded frame is transmitted at the forecasted bandwidth.

Method 400 proceeds to step 440 ("Determine Required Accumulated Bandwidth"). In an embodiment, the required accumulated bandwidth is the sum of bandwidth forecasts associated with individual communication sessions tied to a particular egress channel 326. In other embodiments, the required accumulated bandwidth may be derived, at least in part, from the recent fill rate of the pertinent egress channel 326.

Method 400 proceeds to step 450 ("Adjust Perception Index"). In an embodiment, appliance 160 adjusts Pdx 126 in proportion to the difference between available bandwidth determined at step 410 and required accumulated bandwidth determined at step 440. If the bandwidth difference is unchanged, Pdx value 126 is unchanged, if the accumulated bandwidth forecast (i.e., the 'required accumulated bandwidth') exceeds the available bandwidth as determined at step 410, the Pdx value 126 is lowered in proportion to the difference and if the accumulated bandwidth forecast is less than the available bandwidth as determined at step 410, the Pdx value 126 is increased in proportion to the difference. In some embodiments, Pdx 126 need not be communicated on every iteration of step 450 in the interest of reducing control traffic received by VM 120. For example, in one embodiment, Pdx 126 is communicated less frequently when the required or forecasted accumulated bandwidth and/or egress channel queue depths are within acceptable limits, but is communicated more frequently when the specified limits are violated.

Method 400 proceeds to step 460 ("Queue and Transmit Media") in which packets in the various egress channels 326 are transmitted across respective shared links, shaped to rates determined in step 410 that match the bandwidth of the respective shared links.

In some embodiments in which additional control using Qdx 127 is used, method 400 proceeds to step 470 ("Determine and Communicate Qdx"), else method 400 may proceed directly to step 480. If a specified queue level, such as a 75% full level, for an egress channel 326 is detected (generally signaling an increased latency on the shared link), a Qdx value is transmitted to the VMs 120 associated with the egress channel. The Qdx indicates a requirement for the VMs to adjust their respective packet rates for the encoded media data for a defined period of time. In an embodiment, the Qdx 127 is a binary value that instructs all VMs to suspend all media communications for a pre-determined period (e.g. a fixed 2 ms time period or partial frame period which may differ for different VMs dependent on the current frame rate). In another embodiment, the Qdx 127 specifies a proportional reduction (e.g. 50% reduction) in current packet rate. In another embodiment, the Qdx 127 specifies both a time period and a proportional reduction in packet rate.

Method 400 proceeds to step 480 ("End?"). If any communication sessions associated with an egress channel remain active (i.e., at least one media source continues to transmit packets associated with the communication session), method 400 proceeds to step 484 ("Update source list") and thereafter returns to step 410. At step 484, the current status of each communication session is verified, for example by conducting an audit of the status of each active communication session (e.g. observing transport protocol information from packets communicated through appliance 160) or auditing packets in the egress channel 326. The source list is updated to reflect any subscription changes such as additional VMs utilizing defined egress channels, additional VMs demanding new egress channels associated with new shared links, recently terminated sessions and so on. If new sessions have been established, network appliance 160 may provide the new users with current bandwidth availability and number of other active users sharing the egress channel in order for new users to establish appropriate initial encoding parameters. In some embodiments, inactive sessions are terminated following a defined period of inactivity and the media source is notified that a new subscription will be required in order to re-allocate appliance resources. If all communication sessions have been terminated and associated packets processed, method 400 ends at step 482.

Figure 5:
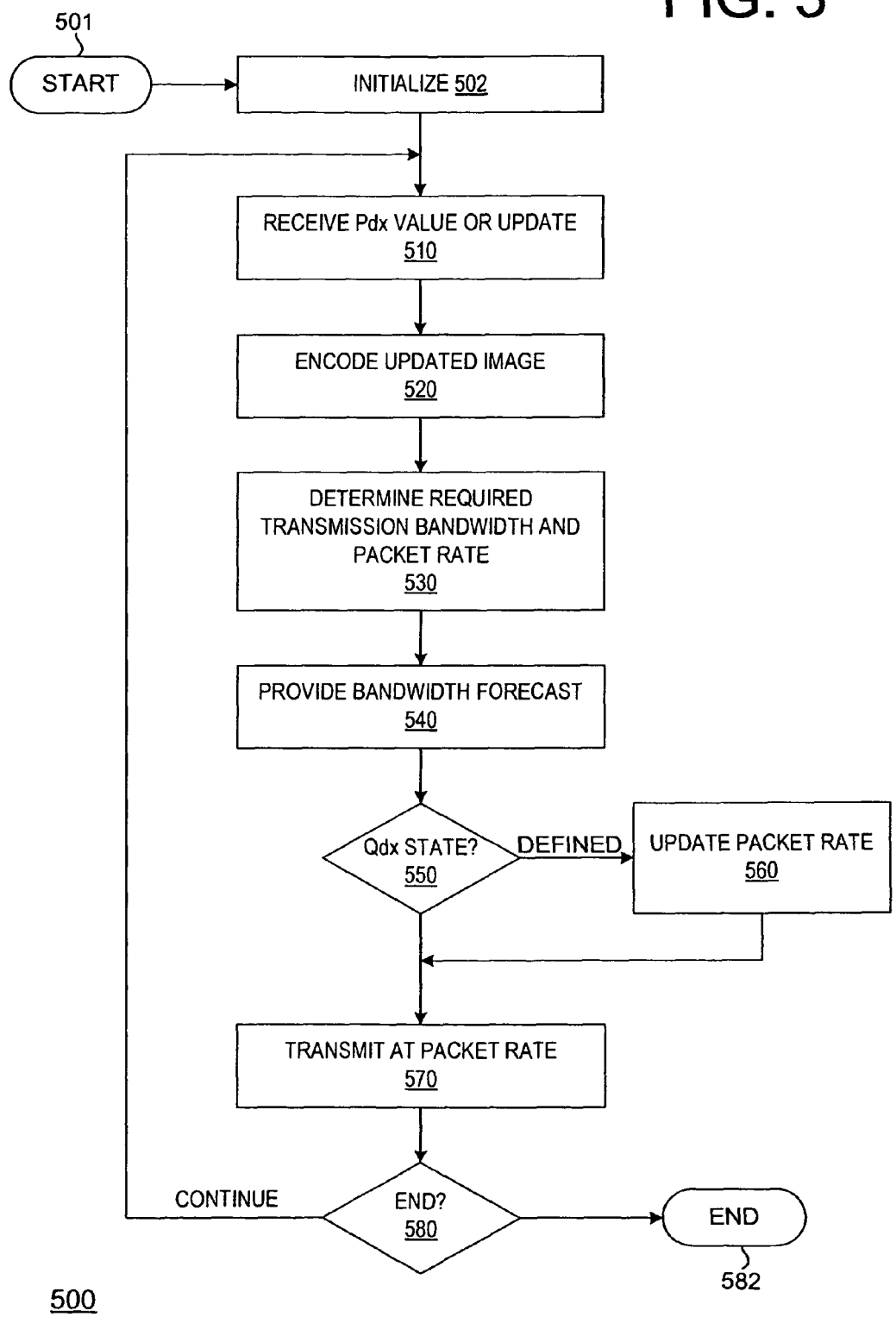
FIG. 5 is a flowchart illustrating a method for communicating media data in accordance with one or more embodiments of the present invention.

FIG. 5 is a block diagram of a method 500 for communicating media data from a media source to a client via an appliance 160 in accordance with one or more embodiments of the present invention. The steps of method 500 are generally executed by each of a plurality of VMs 120 sharing a computer network connection such that each VM transmits media data at its own determined packet rate set in response to a common Pdx value 126 provided by the appliance 160.

Method 500 starts at step 501 and proceeds to step 502 ("Initialize") in which a VM 120 initializes encoder 130, traffic manager 140 and data structures including source image 122, queue 124 and initial Pdx value 126. Pdx 126 may be initialized to a default value, an historic setting or provided by appliance 160 during establishment of a communications session between VM 120 and a client 180 or 182.

Method 500 proceeds to step 510 ("Receive Pdx Value or Update") in which an updated Pdx value 126 (as transmitted by appliance 160 at step 450 of method 400) is received and utilized to adjust the encoding parameters 222. In a typical embodiment, step 510 comprises a background event handler of encoder 130 receiving updated Pdx values independent of the encoding and packet transmission process.

Method 500 proceeds to step 520 ("Encode Image Update") in which an updated portion of an image frame, such as a portion of source image 122 with pixel values that have changed since a previous execution of step 520, is encoded by encoder 130 and stored in queue 124. It is generally recommended that different areas of an image frame maintain a consistent quantization level to minimize quality variations across a single image which may deteriorate the perceived image quality. The current frame rate is determined by the size of an image update (i.e., number of pixels to be encoded), for example following frame rate associations in graph 800 as described below.

Method 500 proceeds to step 530 ("Determine Required Transmission Bandwidth and Packet Rate"). The required transmission bandwidth 128 is a direct function of the selected frame rate and number of bits to be generated at step 520 stored in queue 124. In some embodiments, the number of bits generated at step 520 is predicted based on size of changed portion of source image 122 and/or image content type so that a required transmission bandwidth can be determined ahead of actual encoding performed at step 520. The packet rate set by traffic manager 140 sets an operating transmission rate based on the combination of required transmission bandwidth 128 and a slow start algorithm (e.g. a ramped packet rate or delayed transmission) that enables appliance 160 to broadcast an updated Pdx 126 before the operating transmission bandwidth is reached.

Method 500 proceeds to step 540 ("Provide Bandwidth Forecast"), which comprises communicating required transmission bandwidth 128 to appliance 160, either as a separate message, as a message appended to the next (i.e., subsequent) transmitted packet, an initial packet associated with the next encoded frame or one of the last packets of a previously encoded frame. In some embodiments, the required transmission bandwidth 128 (i.e., an indication of the required transmission bandwidth) is communicated in a clear-text segment of one of the packets. In select embodiments where the forecasted required transmission bandwidth 128 is greater than the present required transmission bandwidth (e.g., as previously communicated to appliance 160), the transition to the increased packet rate associated with the forecasted required transmission bandwidth 128 may be delayed by a specified period such as a sufficient time to ensure appliance 160 has received the updated bandwidth forecast and broadcast an updated Pdx value 126.

Method 500 Proceeds to step 550 ("Qdx State?"). In various embodiments in which a queue index is used to control packet rate, process 500 proceeds to step 560 if a Qdx value 127 is defined (as determined at step 470 of method 400) or proceeds to step 570 if no Qdx value is defined. At step 560 ("Update Packet Rate"), the packet rate defined at step 530 is temporarily adjusted. For example, transmission may be suspended for a defined partial frame period Method 500 proceeds to step 570 ("Transmit at Packet Rate") in which the current encoded frame (stored in queue 124) is transmitted to appliance 160 as a series comprising one or more packets at the packet rate determined at step 530.

Method 500 proceeds to step 580 ("End?"), following which method 500 returns to step 510 if additional media is available in queue 124 for transmission, or method 500 ends at step 582, for example on termination of the communication session. On each subsequent pass of method 500, a subsequent updated portion of the source image 122 is encoded. A subsequent required transmission bandwidth 128 is determined based on the size of the subsequent updated portion and the frame rate defined by the Pdx value 126. The subsequent encoded frame is transmitted as subsequent packets at a subsequent packet rate based on the subsequent required transmission bandwidth (i.e. bandwidth forecast 128).

Figure 6:
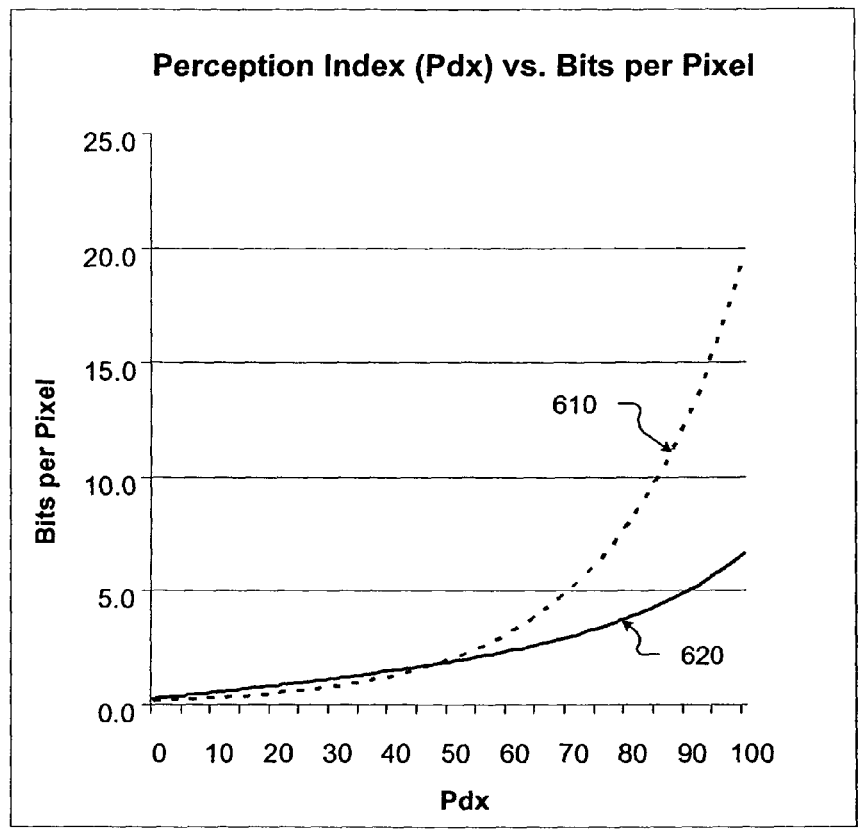
FIG. 6 is a graphical diagram of a graph depicting a range of compression ratios for an exemplary set of perception indices in accordance with one or more embodiments of the present invention.

FIG. 6 illustrates graph 600 showing an ideal range of compression ratios expressed in terms of compressed bits per pixel (bpp) for a range of Pdx values spanning the range 0 through 100 in accordance with one or more embodiments of the present invention. For any specified Pdx value, encoder 130 achieves the corresponding compression ratio by adjusting the quantization of the lossy encoder (ref. quantization level 224) or reducing the update frame rate. In graph 600, a Pdx of "0" determines an illegible image (for example, as defined using a subjective Mean Opinion Score (MOS) index) while a Pdx of "100" determines a lossless image. Plot 610 shows a compression range from 0 bpp for an illegible image determined by a Pdx of "0" through approximately a compression ratio of 20 bpp for a Pdx of "100" for a video display image (i.e., an image frame of picture type). Plot 620 shows a compression range from 0 bpp for an illegible image determined by a Pdx of "0" through a compression ratio of 7 bpp for a Pdx of "100" for a display image of mixed image type (i.e., an image frame comprising different areas of text, background and picture image types). The image of mixed image type achieves better compression when the different image types are subjected to different encoding methods (e.g., background image types are highly compressed by lossless encoder function 210, text image types are suited to color cache encoding methods, and picture image types are suited to transform encoding methods such as wavelet or Discrete Fourier Transform (DCT) encoding executed by lossless encoder function 202). In other embodiments, different lossy compression ratios are applied according to content characteristics, either by changing the encoder or by adjusting the quantization.

Figure 7:
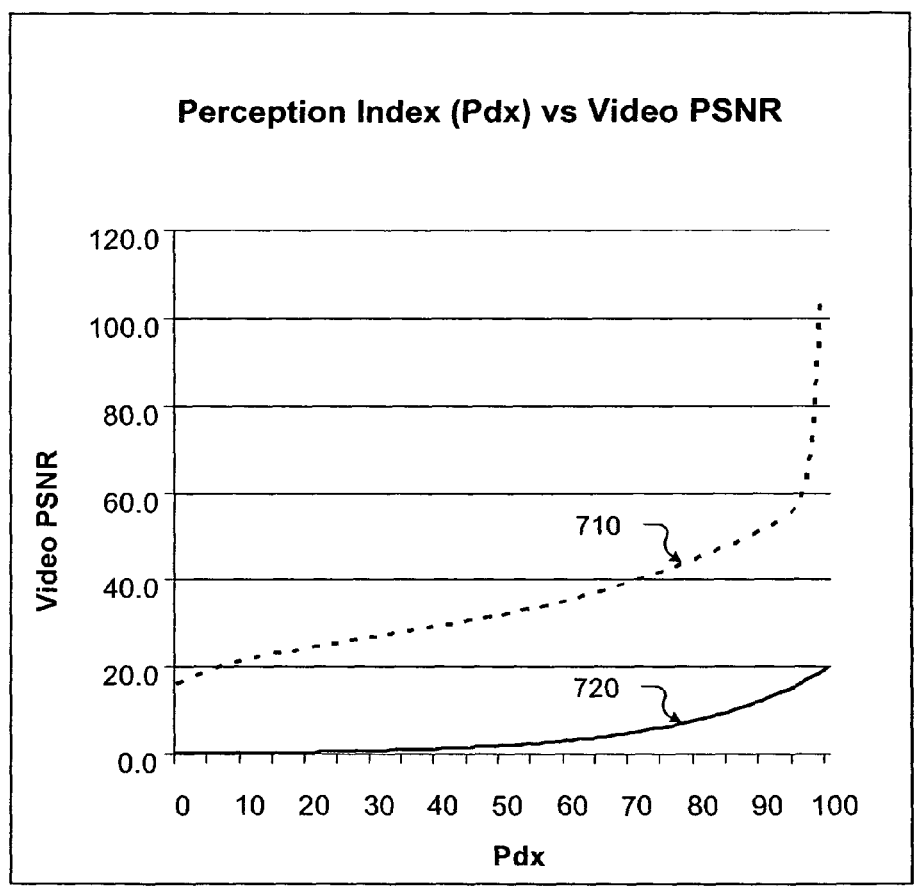
FIG. 7 is a graphical diagram of a graph showing two related video metrics as a function of perception index in accordance with one or more embodiments of the present invention.

FIG. 7 illustrates graph 700 showing two related video metrics as a function of Pdx for a set of Pdx values spanning the range 0 through 100 in accordance with one or more embodiments of the present invention. Plot 710 shows the Peak Signal to Noise ratio (PSNR) for a video image frame across the span of Pdx values. Plot 720 is an overlay of plot 610 from FIG. 6 which shows the compression ratio required to achieve the PSNR of plot 710. The divergence between PSNR and bpp for Pdx values in the range of 90-100 is attributed to the fact that perceived image quality of a video frame sequence or picture image types does not correlate with the image PSNR in a linear manner.

Figure 8:
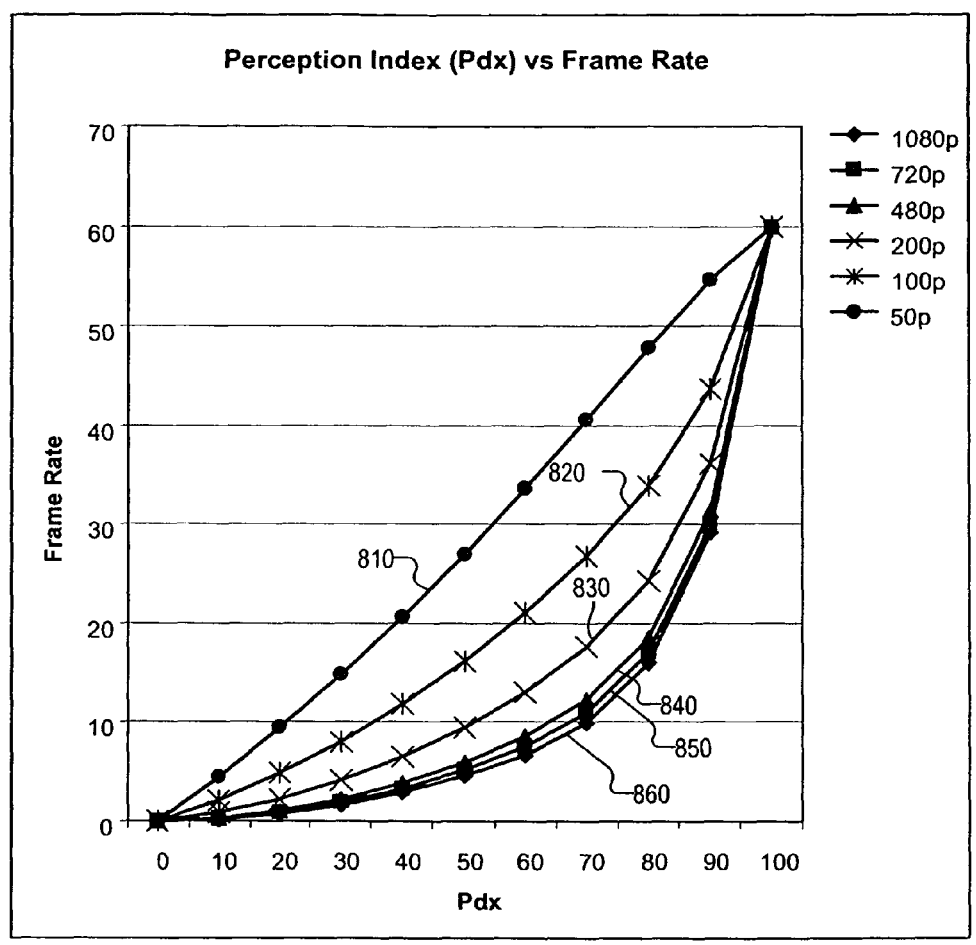
FIG. 8 is a graphical diagram of a graph depicting required compression ratios for a set of video sequences in accordance with one or more embodiments of the present invention.

FIG. 8 illustrates graph 800 showing required compression ratios in terms of specified frame rate, expressed in terms of frames per second (fps) for a set of video sequences over the range of Pdx values between 0 and 100 in accordance with one or more embodiments of the present invention. Graph 800 provides a mapping for encoder manager 220 to determine update frame rates from Pdx 126. Plot 810 depicts fps for a 50p progressive display video (i.e., 50 lines video type), plot 820 depicts fps for a 100p progressive display video, plot 830 depicts fps for a 200p progressive display video, plot 840 depicts fps for a 480p progressive display video, plot 850 depicts fps for a 720p progressive display video, and plot 860 depicts fps for a 1080p progressive display video.

FIG. 9 is an illustration of a source image 900 associated with a single VM 120 shown during two time periods, illustrating one embodiment in which encoder 130 adjusts encoding parameters 222 for a given Pdx value 126 (shown as a period 950 and a period 960) during which a source image is changing. FIG. 9A illustrates period 950 during which source image 900 undergoes a series of consecutive frame updates. During period 950, section 902 of source image 900 is changing but section 904 of source image 900 remains unchanged (i.e. static). Period 950 might be exemplified by a small 50p video window (section 902) comprising pixels updated at 60 fps overlaid on a large static photograph (section 904). FIG. 9B illustrates period 960 during which source image 900 undergoes a different series of consecutive frame updates in which section 912 of source image 900 remains unchanged but section 914 source image 900 is changing. Period 960 might be exemplified by a large 720p video display (section 914) changing at a 30 fps video frame rate behind a static window (section 912). In both time periods 950 and 960, the selected frame encoding rate is dependent on the size of the changed image as defined by graph 800 in addition to the current Pdx value 126. For example, given a Pdx value 126 of 55, section 902 will be encoded at approximately 30 fps during period 950 but section 914 will be encoded at approximately 5 fps, thereby taking approximately 6 times longer to complete each encoded frame update. Fair sharing of a common network link (e.g., shared computer network connection 172 or 174) is accomplished by allocating more bandwidth to larger image updates than smaller image updates, but such larger image updates take longer to complete.

FIG. 10 illustrates one embodiment of a sequence 1020 comprising a first time period 1050 in which a source image 1000 associated with a single VM 120 is changing, followed by a second time period 1060 in which the source image 1000 continues to change and a second source image 1010 associated with a second VM 120 sharing a constrained network link also changes. Sequence 1020 illustrates the manner in which two encoders use a common (dynamic) Pdx value 126 to determine separate encoding parameters in order to achieve fair sharing of a common network link.

Period 1050 might be exemplified by a period in which a small 50p video window (section 1002) of source image 1000 is updated at 60 fps. During period 1050, the Pdx 126 is determined by the queue level of an egress channel 326 associated with a single user of the common network link. A Pdx of 55 might generate an encoded frame rate of 30 fps as for period 1050 described.

Period 1060 might be exemplified by a period in which the small 50p video window (section 1002) of source image 1000 continues to change at 60 fps but a large 720p video display changing at a 30 fps video frame rate (section 1012) associated with the second source image 1010 of the different VM shares the common network link. At the start of period 1060, the Pdx value 126 is decreased, responsive to an increased accumulated bandwidth forecast and/or an increase in the queue level of the egress channel 326. The first encoder associated with source image 1000 responds to the decreased Pdx by reducing the frame rate (following curve 810) and adjusting the quantization level (following curve 610) to increase the compression ratio. The second encoder associated with source image 1010 adjusts encoding parameters according to the decreased Pdx value 126, the frame rate following curve 850 and the quantization level following curve 610. While the frame rate of section 1002 is reduced in period 1060, it remains higher than the frame rate of the larger section 1012. For example, by evaluating graph 800, if the Pdx value 126 is decreased from 55 to 40, the 50p image frame rate (section 1002) falls from approximately 30 fps to approximately 20 fps, while the 720p image frame rate (section 1012) falls from approximately 5 fps to approximately 3 fps.

Figure 11:
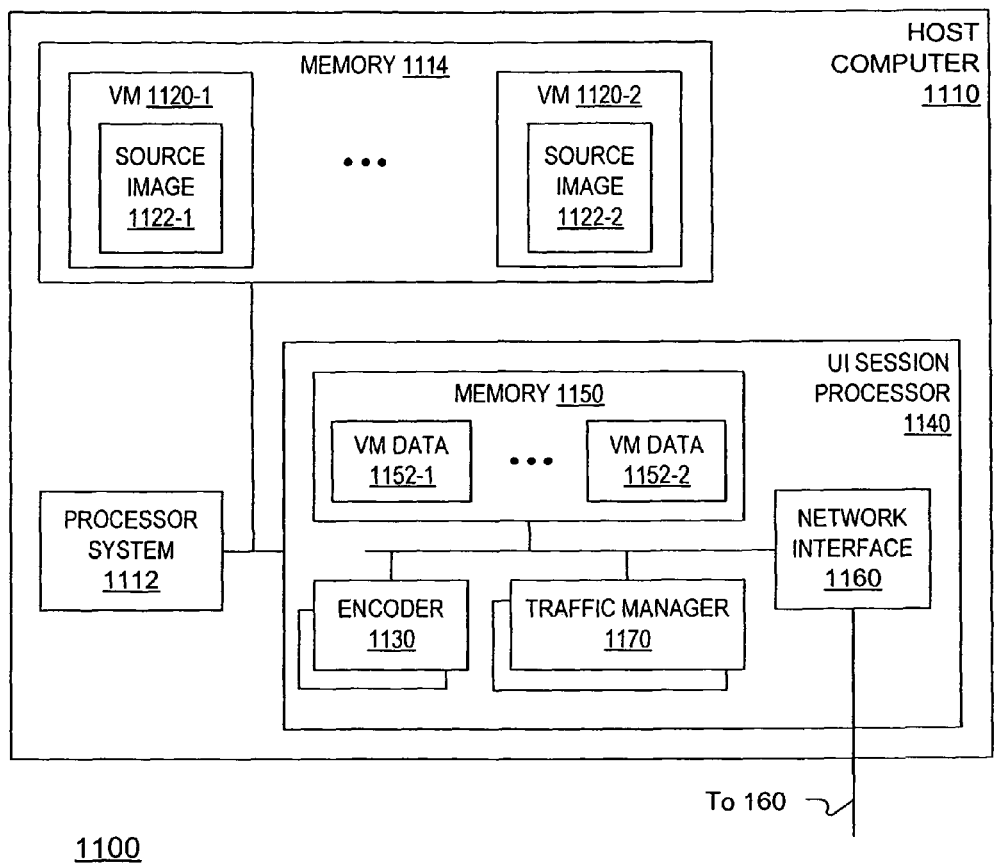
FIG. 11 is an illustration of an embodiment of a host computer comprising a session processor enabled to encode multiple source images.

FIG. 11 is a block diagram 1100 of a host computer 1110 which is an alternative embodiment of host computer 110 in FIG. 1. Host computer 1110 comprises processor system 1112 coupled to memory 1114 and User Interface (UI) Session Processor 1140. Unlike host computer 110 in which encoder 130 and traffic manager 140 are executed at least in part as software functions, encoding is performed by one or more hardware-optimized encoders 1130 and traffic management is performed by one or more hardware-optimized traffic managers 1170. In an embodiment, processor 1140 comprises a dedicated network interface 1160. In other embodiments, processor 1140 utilizes network interface facilities provided by processor system 1112. In one such embodiment, encoded media data is transferred back to VM 1120 where traffic management resources of VM 1120 regulate the transmission of encoded media data to appliance 160.

The virtual machines VM 1120-1 and VM 1120-2 comprise source images 1122-1 and 1122-2, respectively, equivalent to those for VMs 120. However, queue 124, Pdx 126 and Qdx 127 reside in memory 1150 of UI session processor 1140, collectively labeled VM Data 1152-1 (queue 124, Pdx 126 and Qdx 127 associated with VM 1120-1) and VM Data 1152-2 (queue 124, Pdx 126 and Qdx 127 associated with VM 1120-2). An embodiment of UI session processor 1140 is disclosed in commonly assigned, co-pending U.S. patent application Ser. No. 12/657,618, filed Jan. 22, 2010, entitled "System and Method for Managing Multiple User Interface Sessions", which is incorporated herein by reference in its entirety. In other embodiments in which processor 1140 is located on a different physical computing platform to host computer 1110, each host computer comprising a media source stream source images to processor 1140 over one or more image busses, such as one or more Digital Visual Interface (DVI), THUNDERBOLT, PCI-EXPRESS or DISPLAY-PORT interconnects.

While the foregoing is directed to embodiments of the present invention, other and further embodiments of the invention may be devised without departing from the basic scope thereof, and the scope thereof is determined by the claims that follow.

The invention claimed is:

1. A method of managing communication of encoded media from a plurality of media sources, the method comprising:

determining, by a network appliance, an available bandwidth of a computer network connection shared by a communication session of each media source of the plurality of media sources;

communicating, by the network appliance, a common perception index value and an adjustment to the common perception index value, to each of the plurality of media sources;

determining, by the network appliance, a required accumulated bandwidth for transmitting via the computer network connection, the encoded media from each media source of the plurality of media sources; and adjusting, by the network appliance, the common perception index value based on a comparison of the available bandwidth and the required accumulated bandwidth, wherein the common perception index value defines for each of the communication sessions, based on a pixel size of an associated image update, (i) an image encoding frame rate and a quantization level for generating an encoding of the associated image update, and (ii) a bandwidth for transmitting the encoding; and wherein, for each media source of the plurality of media sources, pixel sizes of successive image updates are sporadically inconsistent.

2. The method of claim 1, wherein determining the available bandwidth comprises observing transport protocol information of packets used in the communication of the encoded media.

3. The method of claim 2, wherein each media source of the plurality of media sources communicates its associated encoded media data of the encoded media with one of a plurality of clients and wherein the transport protocol information comprises transport acknowledgement of the packets.

4. The method of claim 1, further comprising, by the network appliance, receiving and queuing the encoded media from the plurality of media sources, and transmitting the encoded media based on the available bandwidth.

5. The method of claim 4, wherein queuing the encoded media comprises detecting a queue level of the encoded media and communicating a queue index value to the plurality of media sources, the queue index value indicating a requirement to adjust a transmission bandwidth of the encoded media for a defined period.

6. The method of claim 4, wherein transmitting the encoded media based on the available bandwidth comprises traffic shaping the transmission, via the computer network connection, of packets comprising the encoded media.

7. The method of claim 1, further comprising receiving, by the network appliance, from each media source of the plurality of media sources, a bandwidth forecast used in the determining the required accumulated bandwidth.

8. The method of claim 1, further comprising identifying the plurality of media sources by observing transport protocol information of packets communicated through the network appliance.

9. The method of claim 1, wherein each media source of the plurality of media sources is a virtual machine executing on a server and communicating, via the network appliance, with a client computer.

10. A method for communicating media data, the method comprising:
    receiving, by a computer, via a computer network connection, a perception index value;
    determining a pixel size of an updated portion of an image frame, wherein the updated portion is rendered by the computer subsequent to an encoding of a previously updated portion of the image frame, and wherein the pixel size of the updated portion is different from a pixel size of the previously updated portion;
    compressing, by the computer, based on the perception index value, the updated portion to generate an encoded frame;
    determining a frame rate from the perception index value and the pixel size of the updated portion;
    determining, by the computer, a transmission bandwidth based on the pixel size of the updated portion and the frame rate; and
    transmitting, by the computer, via a communication session through the computer network connection, the encoded frame at a packet rate based on the transmission bandwidth, wherein the perception index value is based on an available bandwidth, to a plurality of communication sessions, of a shared network connection and wherein the plurality of communication sessions comprises the communication session.

11. The method of claim 10, further comprising receiving a queue index value and adjusting the packet rate for a period of time responsive to the queue index value.

12. The method of claim 10, further comprising transmitting an indication of the transmission bandwidth, wherein the encoded frame is transmitted as packets and the indication is transmitted in a clear-text segment of one of the packets.

13. The method of claim 10, wherein the image frame comprises a computer display image updated by the computer, and wherein the updated portion of the image frame comprises a different selection of pixels from the previously updated portion of the image frame.

14. The method of claim 10, wherein the receiving, the compressing, the determining the frame rate, the determining the transmission bandwidth and the transmitting are performed by one of a plurality of virtual machines executing on the computer.

15. The method of claim 10, wherein an image quantization level for the compressing is based on at least one of the perception index value or a number of pixels in the updated portion.

16. The method of claim 10, further comprising receiving a perception index value update and adjusting the transmission bandwidth and the packet rate based on the perception index value update.

17. The method of claim 10, further comprising:
    compressing a subsequent updated portion of the image frame to generate a subsequent encoded frame, the subsequent updated portion comprising pixel values changed since the compressing of the updated portion of the image frame;
    determining a subsequent transmission bandwidth based on the subsequent updated portion and a subsequent frame rate defined by the perception index value; and
    transmitting the subsequent encoded frame at a subsequent packet rate based on the subsequent transmission bandwidth.

18. The method of claim 10, wherein the computer network connection is shared by a plurality of computers, each computer of the plurality of computers transmits an associated media data at an associated bandwidth defined by the perception index value and an associated updated portion of an associated frame.

19. The method of claim 10, wherein the frame rate is adjusted based on a detection of interaction between a user and the computer.

20. An apparatus for managing communication of encoded media from a plurality of media sources, comprising:
    a network appliance adapted to (i) determine an available bandwidth of a computer network connection shared by a communication session of each media source of the plurality of media sources, (ii) communicate a common perception index value and an adjustment to the common perception index value, to each of the plurality of media sources, (iii) determine a required accumulated bandwidth for transmitting, via the computer network connection, the encoded media from each media source of the plurality of media sources, and (iv) adjust the common perception index value based on a comparison of the available bandwidth and the required accumulated bandwidth, wherein the common perception index value defines for each of the communication sessions, based on a pixel size of an associated image update, (i) an image encoding frame rate and a quantization level for generating an encoding of the associated image update, and (ii) a bandwidth for transmitting the encoding; and wherein, for each media source of the plurality of media sources, pixel sizes of successive image updates are sporadically inconsistent.

* * * * *